(12) United States Patent
Chang

(10) Patent No.: US 9,001,043 B2
(45) Date of Patent: Apr. 7, 2015

(54) MOUSE DEVICE

(71) Applicant: Primax Electronics Ltd., Neihu, Taipei (TW)

(72) Inventor: A-Ming Chang, Taipei (TW)

(73) Assignee: Primax Electronics Ltd., Neihu (TW)

( * ) Notice: Subject to any disclaimer, the term of this patent is extended or adjusted under 35 U.S.C. 154(b) by 22 days.

(21) Appl. No.: 14/067,189

(22) Filed: Oct. 30, 2013

(65) Prior Publication Data

US 2015/0029103 A1 Jan. 29, 2015

(30) Foreign Application Priority Data

Jul. 29, 2013 (CN) .......................... 2013 2 0456190

(51) Int. Cl.
G06F 3/0354 (2013.01)
(52) U.S. Cl.
CPC .................................. G06F 3/03543 (2013.01)
(58) Field of Classification Search
CPC .................................................. G06F 3/03543
USPC ........... 24/305, 362; 285/120.1, 145.2, 145.4; 29/402.15; 411/22, 27–28, 30, 36–38, 411/63, 65, 74, 137–138, 302, 319, 328, 411/340, 345, 366.1
See application file for complete search history.

(56) References Cited

U.S. PATENT DOCUMENTS

| | | | | | |
|---|---|---|---|---|---|
| 5,828,364 | A | * | 10/1998 | Siddiqui | 345/163 |
| 6,154,196 | A | * | 11/2000 | Fleck et al. | 345/157 |
| 8,243,018 | B2 | * | 8/2012 | Farag et al. | 345/163 |
| 2002/0140676 | A1 | * | 10/2002 | Kao | 345/163 |
| 2013/0038533 | A1 | * | 2/2013 | Lo | 345/163 |
| 2014/0210720 | A1 | * | 7/2014 | Chang | 345/166 |

* cited by examiner

*Primary Examiner* — William Boddie
*Assistant Examiner* — Andrew Schnirel
(74) *Attorney, Agent, or Firm* — Kirton McConkie; Evan R. Witt

(57) ABSTRACT

A mouse device includes a main casing, a base plate, and a rear swinging part. The base plate includes a concave part and a bulge. The main casing includes a front swinging part. The rear swinging part is disposed within the main casing. Moreover, the front swinging part is embedded within the concave part of the base plate. A bottom surface of the rear swinging part is contacted with a top surface of the bulge. When one side of the main casing is depressed, the front swinging part and the rear swinging part allow the main casing to be correspondingly swung relative to the base plate in a first direction or a second direction.

10 Claims, 9 Drawing Sheets

MOUSE DEVICE

FIELD OF THE INVENTION

The present invention relates to a mouse device, and more particularly to a mouse device with a main casing and a base plate, in which the main casing may be swung relative to the base plate.

BACKGROUND OF THE INVENTION

A mouse device is one of the widely-used cursor control devices of a computer. Hereinafter, the structure of a conventional mouse device will be illustrated with reference to FIG. 1. FIG. 1 is a schematic exploded view illustrating a conventional mouse device.

First of all, the components of the mouse device 1 will be illustrated. The mouse device 1 comprises a main casing 10, a base plate 11, and a circuit board 12. The main casing 10 comprises two pivotal shafts 101 and two pressing parts 102. The two pivotal shafts 101 are located at a front side and a rear side of the main casing 10, respectively. The base plate 11 comprises two fastening slots 111. The two fastening slots 111 are located at a front side and a rear side of the base plate 11, respectively. Moreover, the mouse device 1 further comprises two springs 13, a first switch 14, and a second switch 15. The first switch 14 and the second switch 15 are disposed on a top surface of the circuit board 12. The two springs 13 are disposed on the first switch 14 and the second switch 15, respectively.

For assembling the mouse device 1, the circuit board 12 is firstly disposed on the base plate 11. The main casing 10 is connected with the base plate 11 from the top side of the circuit board 12. Moreover, the two pivotal shafts 101 are inserted into the two fastening slots 111, respectively. Consequently, the main casing 10 may be swung relative to the base plate 11. In addition, after the main casing 10 is connected with the base plate 11, the first switch 14 and the second switch 15 are disposed under the two pressing parts 102, respectively. Moreover, one of the two springs 13 is arranged between the first switch 14 and one of the two pressing parts 102, and the other spring 13 is arranged between the second switch 15 and the other one of the two pressing parts 102.

When a first side or a second side of the main casing 10 of the mouse device 1 is depressed by the user, the main casing 10 is swung relative to the base plate 11. As the main casing 10 is swung relative to the base plate 11, a corresponding pressing part 102 of the two pressing parts 102 is moved downwardly to push a contact part 141 of the first switch 14 or a contact part 151 of the second switch 15. Consequently, a select command, a cut command, a copy command or a paste command is correspondingly executed by the computer.

When the first side or the second side of the main casing 10 of the mouse device 1 is no longer depressed by the user, in response to the restoring forces of the two springs 13, the main casing 10 is returned to its original position where the main casing 10 has not been depressed. Moreover, the first side of the main casing 10 is a left side of a right-hand user who operates the mouse device 1, and the second side of the main casing 10 is a right side of the right-hand user who operates the mouse device 1.

From the above discussions about the conventional mouse device 1, the two pivotal shafts 101 are respectively inserted into the two fastening slots 111, so that the main casing 10 may be swung relative to the base plate 11. Moreover, by depressing the first side or the second side of the mouse device 1, the first switch 14 or the second switch 15 on the circuit board 12 is correspondingly triggered.

However, the conventional mouse device 1 still has some drawbacks. For example, when the two pivotal shafts 101 are rotated within the two fastening slots 111, the rotation is a line contact rolling action. Consequently, in response to a small acting force, the main casing 10 can be swung relative to the base plate 11. Under this circumstance, the tactile feel of depressing the main casing 10 is unstable, and it is difficult to use the user's finger to touch the surface of the main casing 10 to perform the touch control.

Therefore, there is a need of providing an improved mouse device in order to eliminate the above drawbacks of the conventional mouse device.

SUMMARY OF THE INVENTION

The present invention relates to a mouse device with a main casing and a base plate, in which the main casing may be swung relative to the base plate and the tactile feel of depressing the main casing is stable.

In accordance with an aspect of the present invention, there is provided a mouse device. The mouse device includes a base plate, a main casing, a rear swinging part, a first circuit board, a first switch and a second switch. The base plate includes a concave part and a bulge. The concave part is located at a front end of the base plate, and the bulge is located at a rear end of the base plate. The bulge has a top surface with a first slant. The first slant is inclined from an outer periphery of the top surface of the bulge toward a middle region of the top surface of the bulge. The main casing is connected with the base plate and disposed over the base plate. The main casing includes a front swinging part and two pressing parts. The front swinging part is located at a front end of the main casing and embedded within the concave part of the base plate. The two pressing parts are located at bilateral sides of the front swinging part, respectively. The rear swinging part is located at a rear end of the main casing. The rear swinging part has a bottom surface with a second slant. The second slant is inclined from an outer periphery of a bottom surface of the rear swinging part to a middle region of the bottom surface of the rear swinging part. In addition, the bottom surface of the rear swinging part is contacted with the top surface of the bulge. The first circuit board is disposed on the base plate. The first switch and the second switch disposed on the first circuit board. When a first side of the main casing is depressed, the front swinging part and the rear swinging part allow the main casing to be swung relative to the base plate in a first direction, so that the first switch is triggered by one of the two pressing parts. When a second side of the main casing is depressed, the front swinging part and the rear swinging part allow the main casing to be swung relative to the base plate in a second direction, so that the second switch is triggered by the other one of the two pressing parts.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
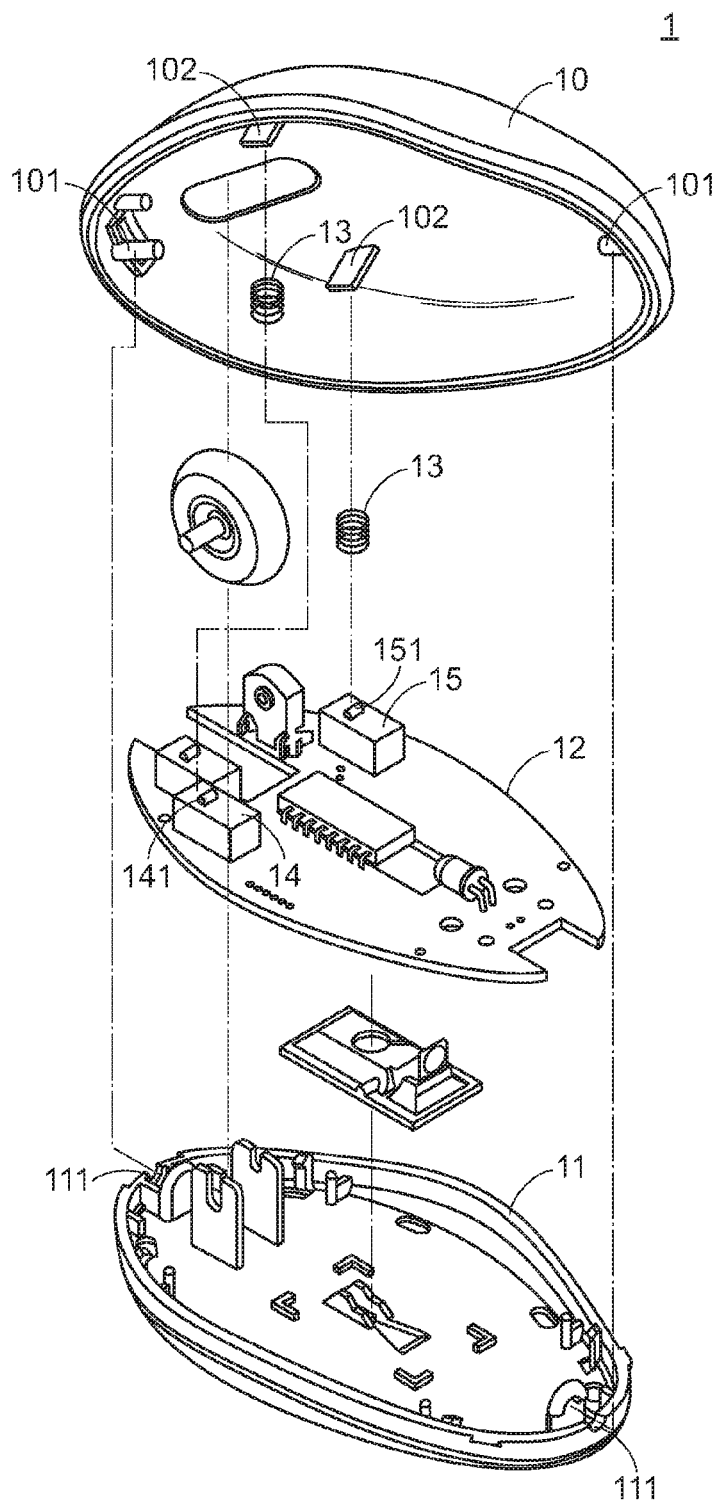
FIG. 1 is a schematic exploded view illustrating a conventional mouse device.
Figure 2:
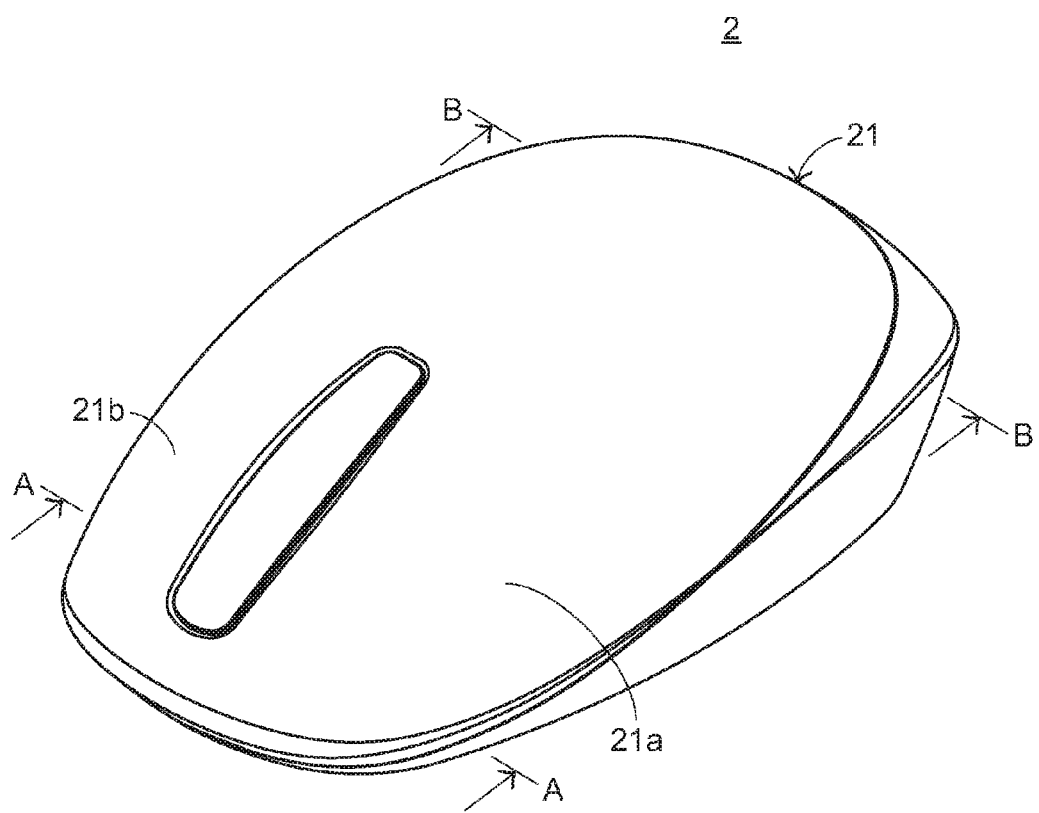
FIG. 2 is a schematic perspective view illustrating the outer appearance of a mouse device according to a first embodiment of the present invention.
Figure 3:
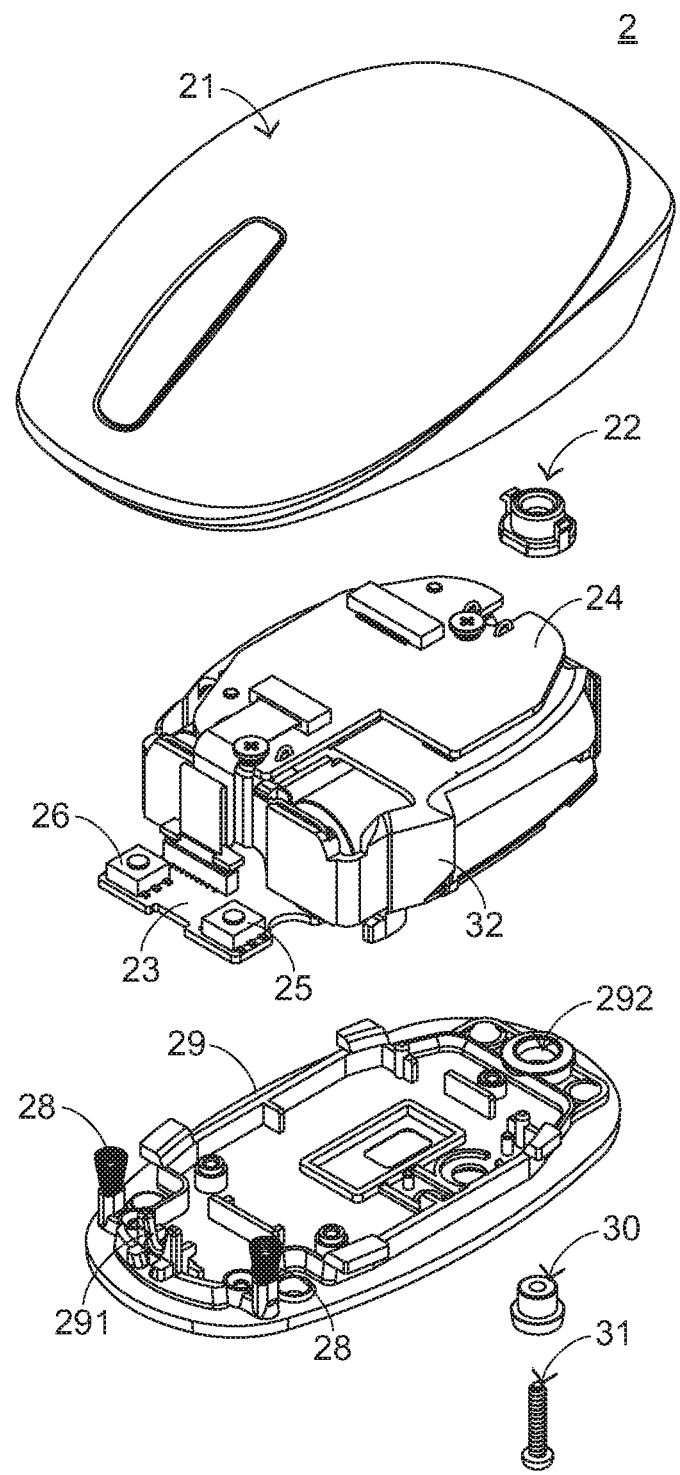
FIG. 3 is a schematic exploded view illustrating the mouse device according to the first embodiment of the present invention.
Figure 4:
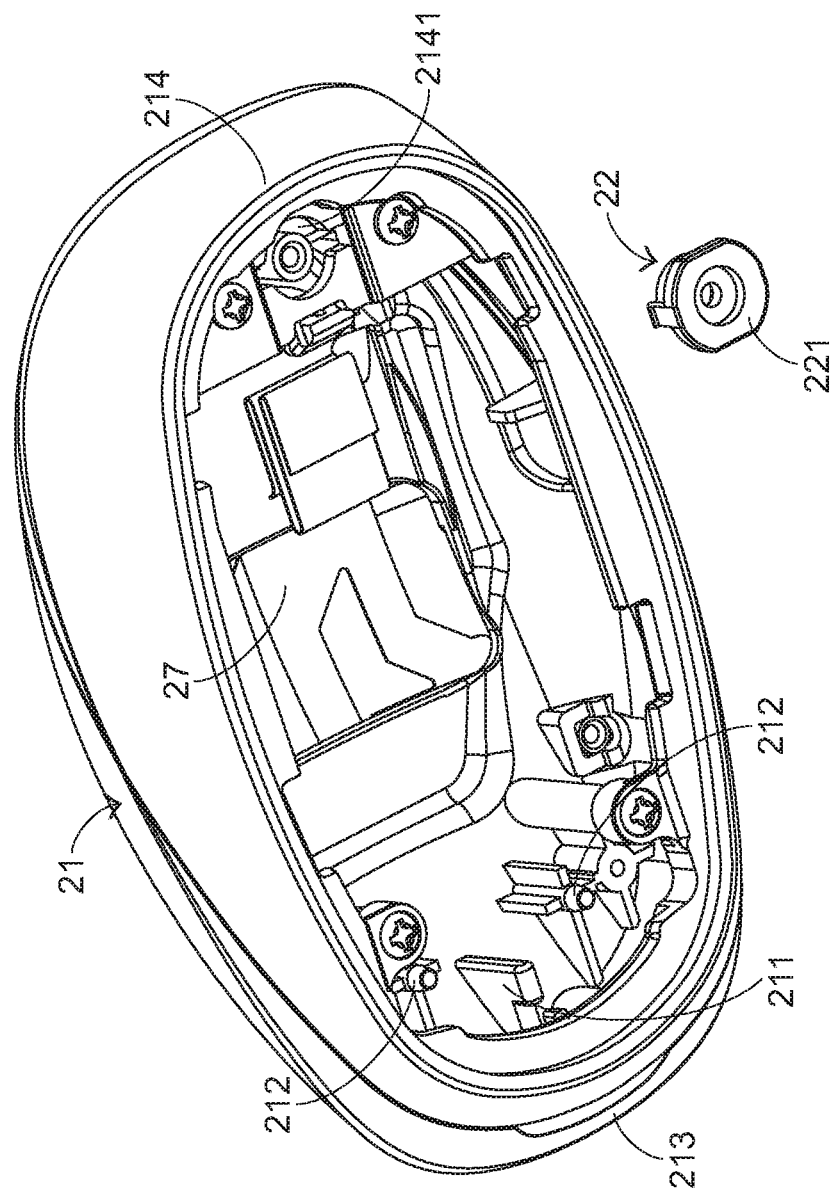
FIG. 4 is a schematic exploded view illustrating a main casing and a rear swinging part of the mouse device according to the first embodiment of the present invention.
Figure 5:
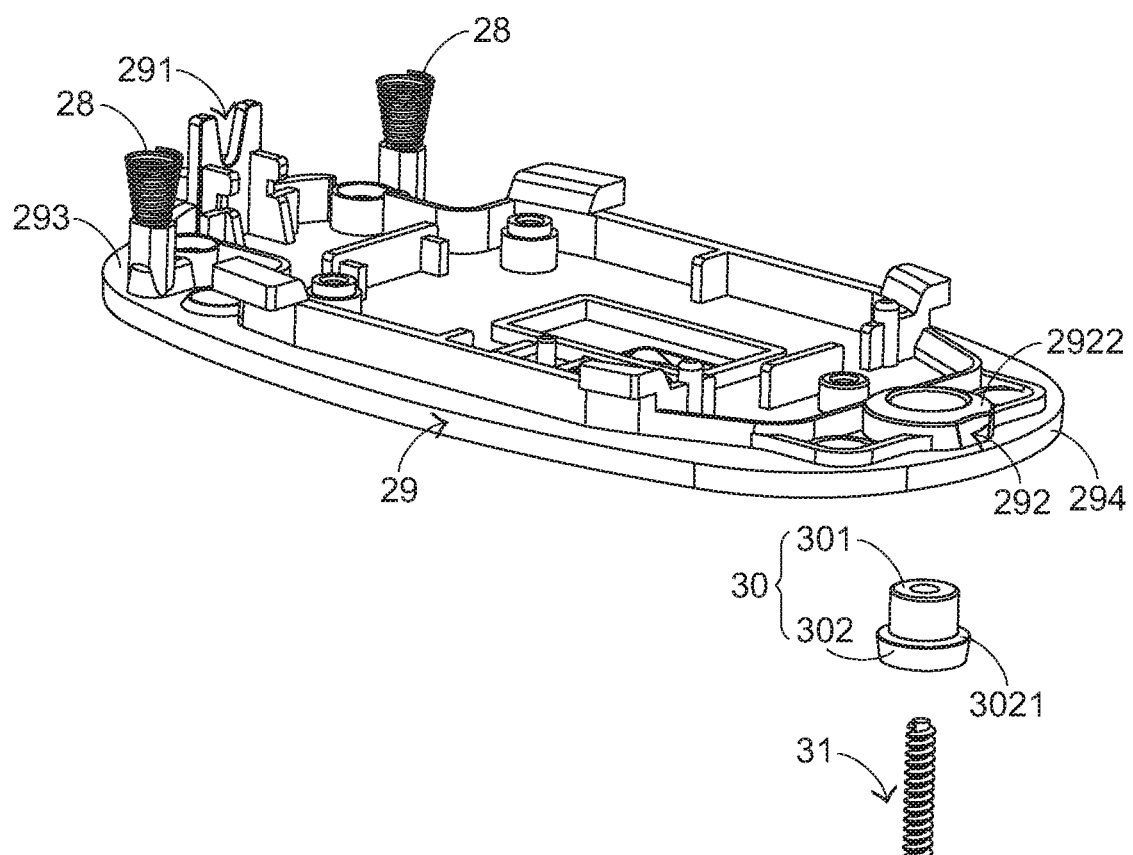
FIG. 5 is a schematic exploded view illustrating a base plate, a fixing block and a fastening element of the mouse device according to the first embodiment of the present invention and taken along a first viewpoint.

Hereinafter, a mouse device 2 according to a first embodiment will be illustrated with reference to FIGS. 2~5. FIG. 2 is a schematic perspective view illustrating the outer appearance of a mouse device according to a first embodiment of the present invention. FIG. 3 is a schematic exploded view illustrating the mouse device according to the first embodiment of the present invention. FIG. 4 is a schematic exploded view illustrating a main casing and a rear swinging part of the mouse device according to the first embodiment of the present invention. FIG. 5 is a schematic exploded view illustrating a base plate, a fixing block and a fastening element of the mouse device according to the first embodiment of the present invention and taken along a first viewpoint.

Hereinafter, the components of the mouse device 2 of this embodiment will be illustrated. The mouse device 2 comprises a main casing 21, a rear swinging part 22, a first circuit board 23, a second circuit board 24, a first switch 25, a second switch 26, a capacitive sensing film 27, two elastic elements 28, the base plate 29, a fixing block 30, and a fastening element 31. The main casing 21 comprises a front swinging part 211 and two pressing parts 212. The base plate 29 comprises a concave part 291 and a bulge 292. The fixing block 30 comprises an insertion part 301 and a stopping part 302.

When the user wants to use the mouse device 2 to execute a left mouse button function or a right mouse button function, the user may depress a first side 21a or a second side 21b of the main casing 21. Consequently, the main casing 21 is swung relative to the base plate 29 to trigger the first switch 25 or the second switch 26. Under this circumstance, the left mouse button function or the right mouse button function is correspondingly executed. In this embodiment, the first side 21a is a left side when the mouse device 2 is held by a right-hand user, and the second side 21b is a right side when the mouse device 2 is held by the right-hand user.

It is noted that the capacitive sensing film 27 is not an essential component. In case that the mouse device 2 has the capacitive sensing film 27, the mouse device 2 is a touch-sensitive mouse device. Under this circumstance, the user's finger may be placed on a surface of the main casing 21 to perform a clicking action, a sliding action or a scrolling action.

The front swinging part 211 is located at a front end 213 of the main casing 21. The two pressing parts 212 are located at bilateral sides of the front swinging part 211, respectively. In this embodiment, the front swinging part 211 is a protrusion plate with two parallel sidewalls, and the pressing parts 212 are protrusion posts.

Moreover, the concave part 291 is located at a front end 293 of the base plate 29, and the bulge 292 is located at a rear end 294 of the base plate 29. In this embodiment, the concave part 291 is a V-shaped recess.

In this embodiment, the stopping part 302 of the fixing block 30 is extended downwardly from the insertion part 301. In addition, the outer perimeter of the stopping part 302 is larger than the outer perimeter of the insertion part 301. Consequently, an annular stopping surface 3021 is formed at a top end of the stopping part 302.

Figure 6:
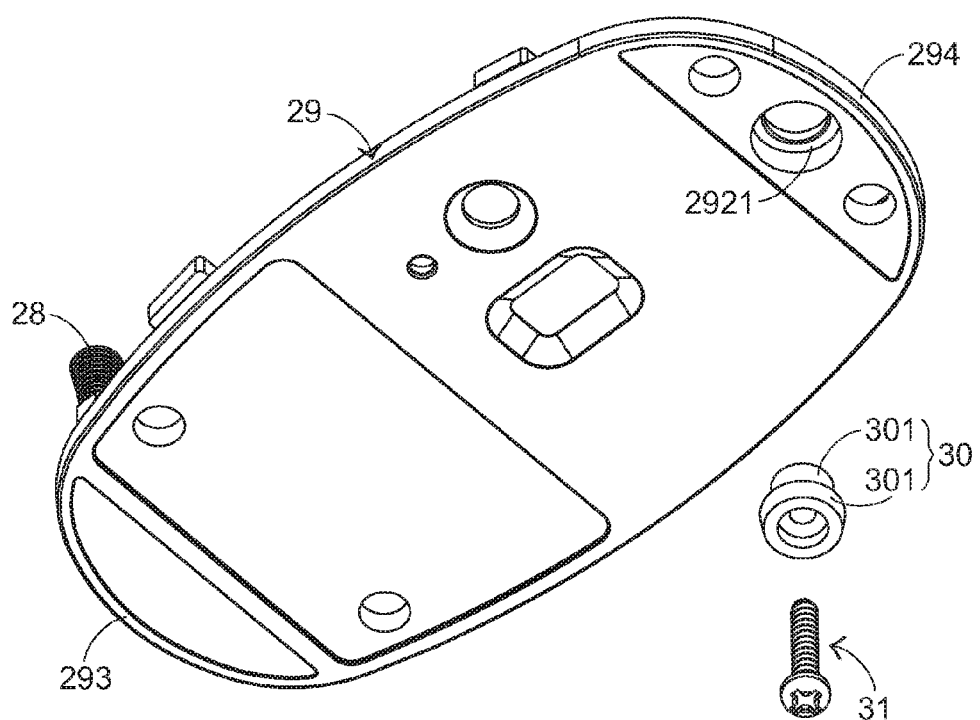
FIG. 6 is a schematic exploded view illustrating the base plate, the fixing block and the fastening element of the mouse device according to the first embodiment of the present invention and taken along a second viewpoint.
Figure 7:
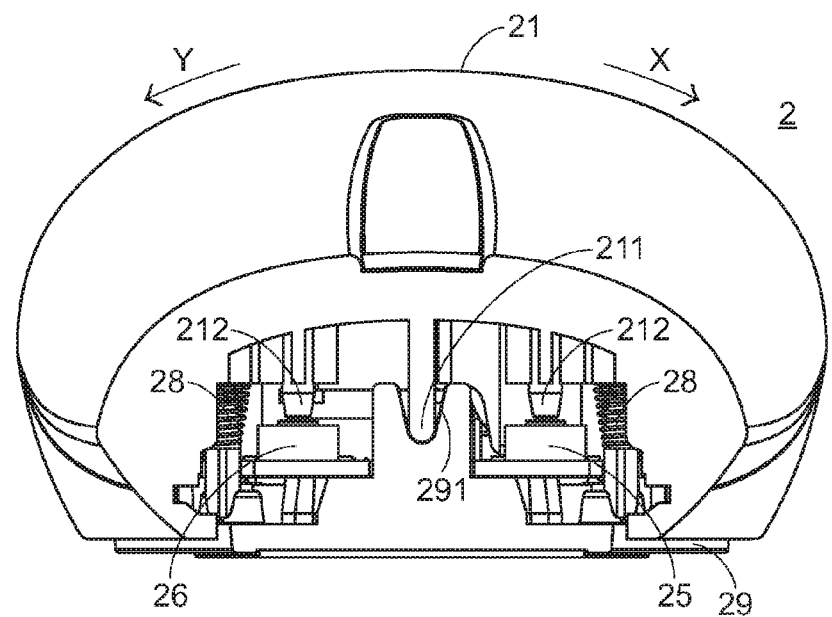
FIG. 7 is a schematic cutaway view illustrating the mouse device according to the first embodiment of the present invention and taken along the line A-A of FIG. 2.
Figure 8:
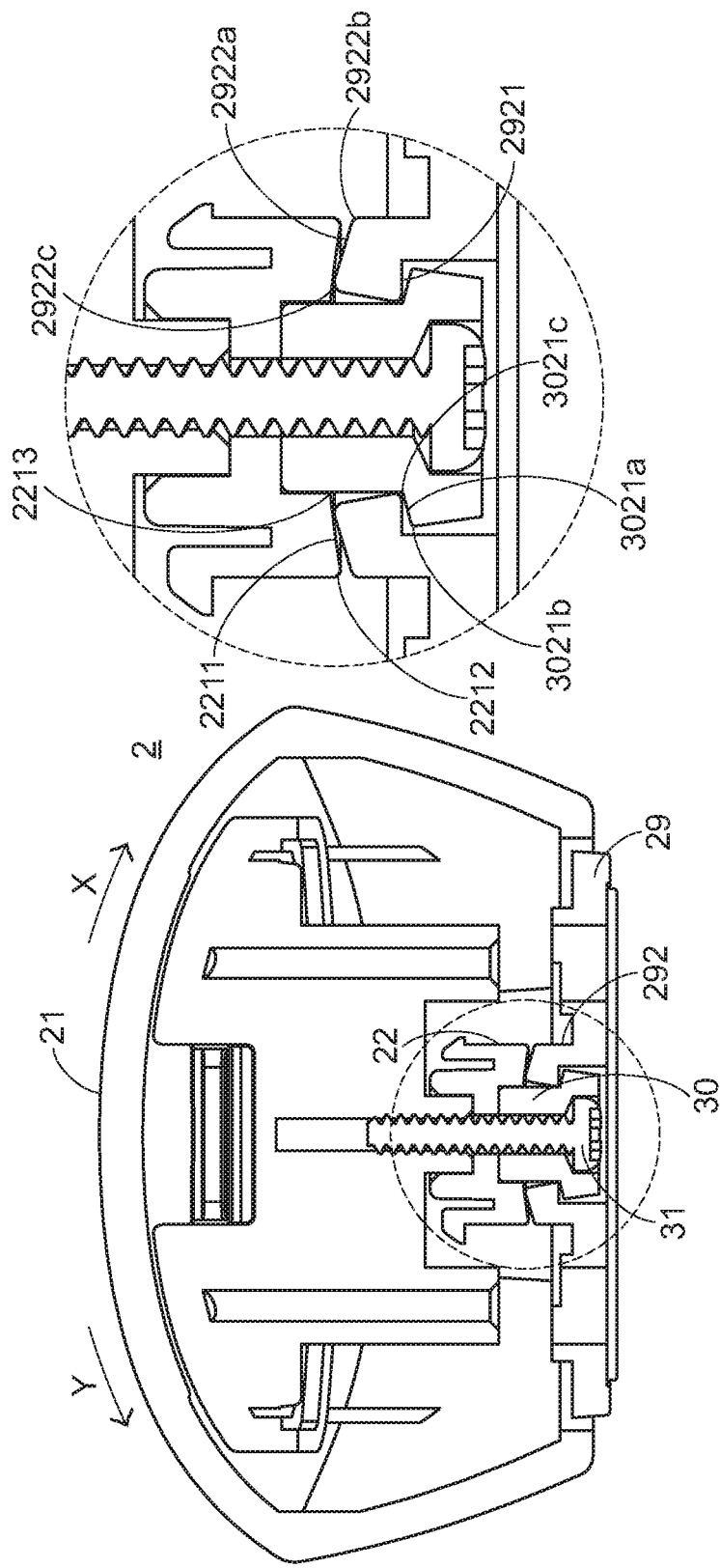
FIG. 8 is another schematic cutaway view illustrating the mouse device according to the first embodiment of the present invention and taken along the line B-B of FIG. 2.

Hereinafter, a sequence of assembling the mouse device 2 will be illustrated with reference to FIGS. 2~8. FIG. 6 is a schematic exploded view illustrating the base plate, the fixing block and the fastening element of the mouse device according to the first embodiment of the present invention and taken along a second viewpoint. FIG. 7 is a schematic cutaway view illustrating the mouse device according to the first embodiment of the present invention and taken along the line A-A of FIG. 2. FIG. 8 is another schematic cutaway view illustrating the mouse device according to the first embodiment of the present invention and taken along the line B-B of FIG. 2.

Firstly, as shown in FIG. 4, the rear swinging part 22 is locked into a fastening slot 2141, which is located at a rear end 214 of the main casing 21. In addition, a bottom surface 221 of the rear swinging part 22 is exposed outside the fastening slot 2141. The capacitive sensing film 27 is disposed within the main casing 21. It is noted that the rear swinging part 22 may be integrally formed with the rear end 214 of the main casing 21.

Moreover, as shown in FIG. 3, the first switch 25 and the second switch 26 are disposed on the first circuit board 23. The second circuit board 24 is disposed over the first circuit board 23. The second circuit board 24 is electrically connected with the first circuit board 23. In this embodiment, the mouse device 2 further comprises a battery storing part 32. The battery storing part 32 is arranged between the second circuit board 24 and the first circuit board 23.

Next, please refer to FIGS. 3, 4 and 5. The first circuit board 23 and the two elastic elements 28 are disposed on the base plate 29. In addition, the two elastic elements 28 are located beside the first switch 25 and the second switch 26, respectively. Then, the capacitive sensing film 27 is electrically connected with the second circuit board 24. The main casing 21 is connected with the base plate 29, and disposed over the base plate 29.

Next, please refer to FIGS. 4, 6 and 8. The insertion part 301 of the fixing block 30 is penetrated upwardly through the bulge 292 of the base plate 29, and locked into the rear swinging part 22. On the other hand, the stopping part 302 of the fixing block 30 cannot be penetrated through the bulge 292. Under this circumstance, the stopping part 302 of the fixing block 30 is disposed under a bottom surface 2921 of the bulge 292, and the annular stopping surface 3021 of the stopping part 302 is contacted with the bottom surface 2921 of the bulge 292.

Afterwards, the fastening element 31 is penetrated through the fixing block 30 and the rear swinging part 22, and tightened into the rear end 214 of the main casing 21. Consequently, the fixing block 30 and the rear swinging part 22 are securely fixed on the main casing 21. In this embodiment, the fastening element 31 is a screw.

Please refer to FIGS. 7 and 8. After the main casing 21 is connected with the base plate 29, the front swinging part 211 is embedded within the concave part 291 of the base plate 21, and the bottom surface 221 of the rear swinging part 22 is contacted with the top surface 2922 of the bulge 292. Moreover, the two elastic elements 28 are fixed between the main casing 21 and the base plate 29. The two pressing parts 212 are disposed over the first switch 25, the second switch 26, respectively.

The features of the present invention will be illustrated as follows. Please refer to FIG. 8. The top surface 2922 of the bulge 292 of the base plate 29 is hollow. In particular, the top surface 2922 of the bulge 292 of the base plate 29 is an annular surface with a first slant 2922a. Moreover, the bottom surface 221 of the rear swinging part 22 is also hollow. In particular, the bottom surface 221 of the rear swinging part 22 is an annular surface with a second slant 2211. The first slant 2922a of the bulge 292 is inclined upwardly from an outer periphery 2922b of the top surface 2922 of the bulge 292 toward a middle region 2922c of the top surface 2922 of the bulge 292. In other words, the top surface 2922 of the bulge 292 is externally raised. The second slant 2211 of the rear swinging part 22 is inclined upwardly from an outer periphery 2212 of a bottom surface 221 of the rear swinging part 22 to a middle region 2213 of the bottom surface 221 of the rear swinging part 22. In other words, the bottom surface 221 of the rear swinging part 22 is internally concaved. In this embodiment, the term "upwardly" denotes the inclining direction toward the main casing 21, and the term "downwardly" denotes the inclining direction toward the base plate 29.

It is noted that numerous modifications and alterations may be made according to the practical requirements. For example, in some embodiments, the first slant 2922a of the bulge 292 is inclined downwardly from the outer periphery 2922b of the top surface 2922 of the bulge 292 toward the middle region 2922c of the top surface 2922 of the bulge 292. In other words, the top surface 2922 of the bulge 292 is internally concaved. Correspondingly, the second slant 2211 of the rear swinging part 22 is inclined downwardly from the outer periphery 2212 of the bottom surface 221 of the rear swinging part 22 to the middle region 2213 of the bottom surface 221 of the rear swinging part 22. In other words, the bottom surface 221 of the rear swinging part 22 is externally raised.

Moreover, the annular stopping surface 3021 of the stopping part 302 of the fixing block 30 further has a third slant 3021a. The third slant 3021a is inclined upwardly from an outer periphery 3021b of the annular stopping surface 3021 toward a middle region 3021c of the annular stopping surface 3021.

Due to the first slant 2922a, the second slant 2211 and the third slant 3021a, the rear swinging part 22 and the fixing block 30 are movable relative to the bulge 292. Consequently, the purpose of swinging the main casing 21 relative to the base plate 29 is achieved.

Hereinafter, the operations of the mouse device 2 will be illustrated with reference to FIGS. 2, 3, 7 and 8. In case that the first side 21a or the second side 21b of the main casing 21 is not depressed (see FIGS. 7 and 8), the two elastic elements 28 are not compressed, and the first switch 25 and the second switch 26 are not triggered.

When the first side 21a of the main casing 21 is depressed, the front swinging part 211 of the main casing 21 within the concave part 291 of the base plate 29 is swung in a first direction X, the bottom surface 221 of the rear swinging part 22 is moved along the top surface 2922 of the bulge 292 of the base plate 29 in the first direction X, and the annular stopping surface 3021 of the fixing block 30 is moved relative to the bottom surface 2921 of the bulge 292 in the first direction X. Consequently, the main casing 21, the rear swinging part 22 and the fixing block 30 are simultaneously swung relative to the base plate 29 in the first direction X. Under this circumstance, the first switch 25 is pushed by a corresponding one of the two pressing parts 212 to be triggered. Consequently, a left mouse button function is executed by the computer. For example, the left mouse button function is a program activating function or a selecting function.

Moreover, when the main casing 21 is swung, the corresponding elastic element 28 is compressed and subject to deformation. Consequently, when the first side 21a of the main casing 21 is no longer depressed by the user, the elastic element 28 is restored to the original shape. Under this circumstance, the main casing 21, the rear swinging part 22 and the fixing block 30 are returned to their original positions where the first side 21a of the main casing 21 has not been depressed (see FIGS. 7 and 8).

Similarly, when the second side 21b of the main casing 21 is depressed, the front swinging part 211 of the main casing 21 within the concave part 291 of the base plate 29 is swung in a second direction Y, the bottom surface 221 of the rear swinging part 22 is moved along the top surface 2922 of the bulge 292 of the base plate 29 in the second direction Y, and the annular stopping surface 3021 of the fixing block 30 is moved relative to the bottom surface 2921 of the bulge 292 in the second direction Y. Consequently, the main casing 21, the rear swinging part 22 and the fixing block 30 are simultaneously swung relative to the base plate 29 in the second direction Y. Under this circumstance, the second switch 26 is pushed by a corresponding one of the two pressing parts 212 to be triggered. Consequently, a right mouse button function is executed by the computer. For example, the right mouse button function is a file opening function.

Moreover, when the main casing 21 is swung, the corresponding elastic element 28 is compressed and subject to deformation. Consequently, when the second side 21b of the main casing 21 is no longer depressed by the user, the elastic element 28 is restored to the original shape. Under this circumstance, the main casing 21, the rear swinging part 22 and the fixing block 30 are returned to their original positions where the second side 21b of the main casing 21 has not been depressed.

Figure 9:
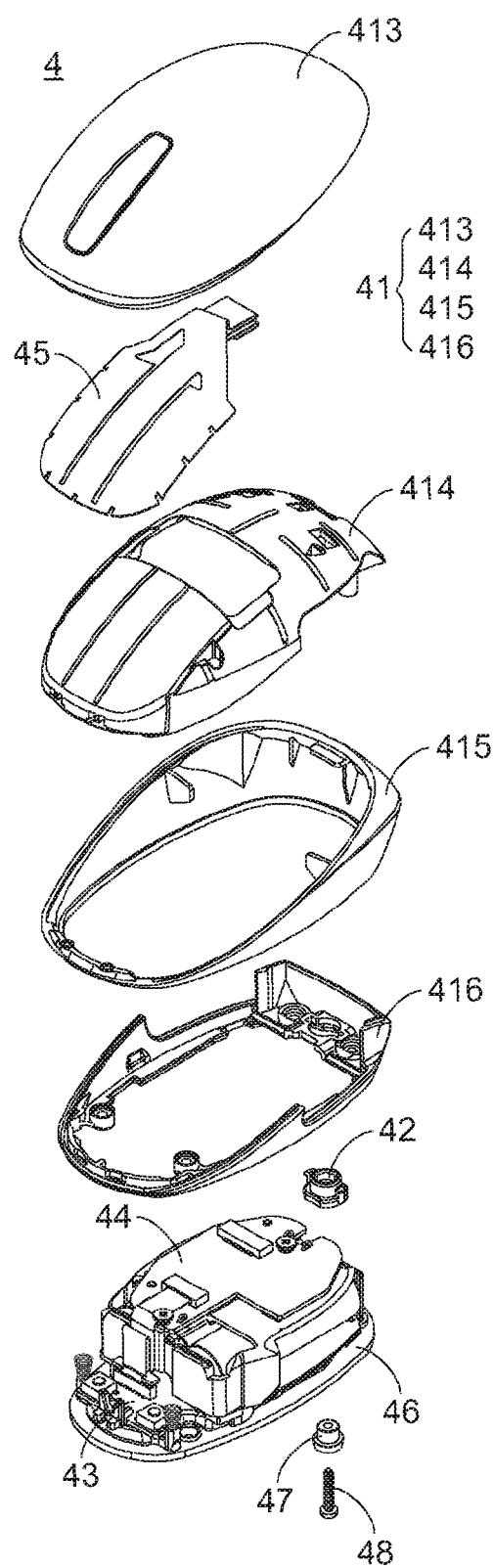
FIG. 9 is a schematic exploded view illustrating a mouse device according to a second embodiment of the present invention.
Figure 10:
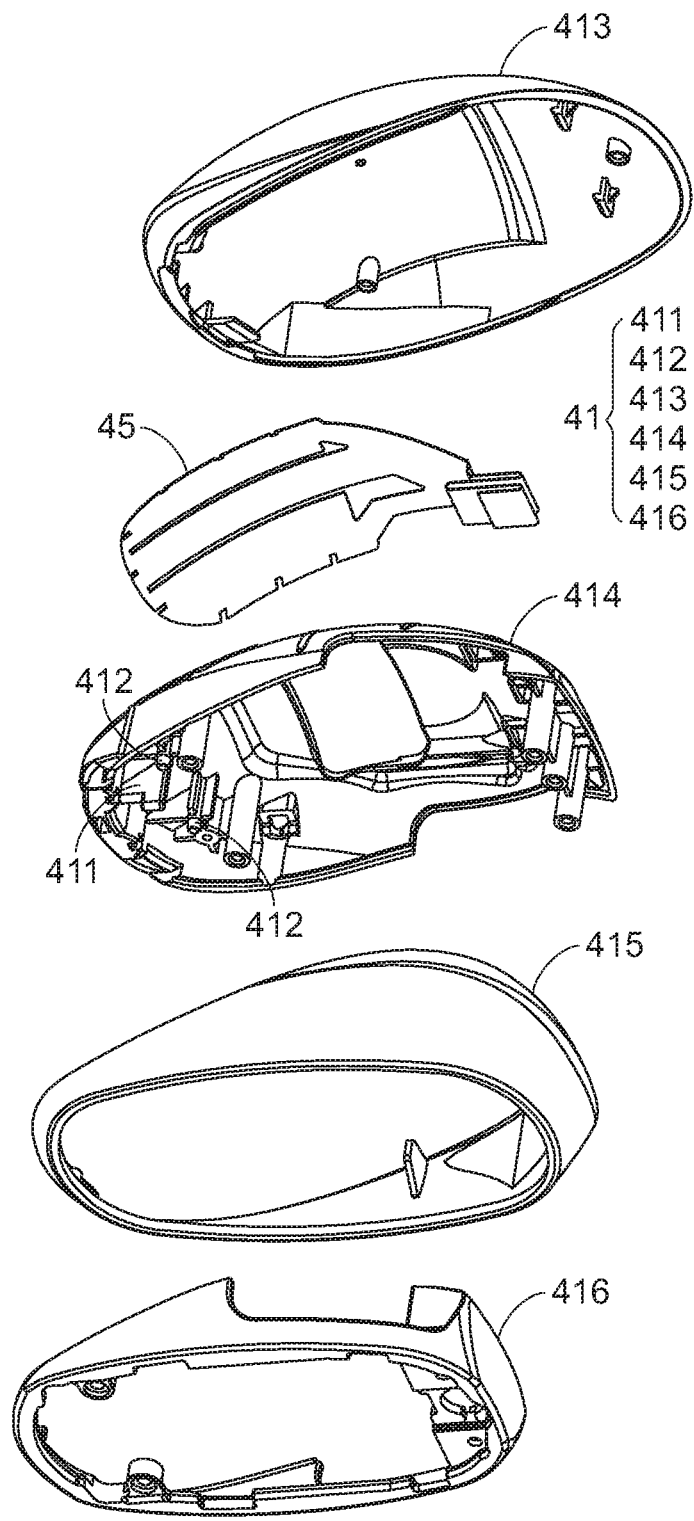
FIG. 10 is a schematic exploded view illustrating a main casing the mouse device according to the second embodiment of the present invention.

Hereinafter, a mouse device 4 according to a second embodiment will be illustrated with reference to FIGS. 9 and 10. FIG. 9 is a schematic exploded view illustrating a mouse device according to a second embodiment of the present invention. FIG. 10 is a schematic exploded view illustrating a main casing the mouse device according to the second embodiment of the present invention. In this embodiment, the mouse device 4 comprises a main casing 41, a rear swinging part 42, a first circuit board 43, a second circuit board 44, a capacitive sensing film 45, a base plate 46, a fixing block 47, and a fastening element 48. The main casing 41 comprises a front swinging part 411 and two pressing parts 412.

In comparison with the first embodiment, the main casing 41 of the mouse device 4 comprises an outer cover 413, an upper cover 414, an annular outer shell 415, and a hollow connecting plate 416. The upper cover 414 is disposed within the outer cover 413. The capacitive sensing film 45 is arranged between the outer cover 413 and the upper cover 414. The front swinging part 411 and the two pressing parts 412 are protruded from an inner surface of the upper cover 414.

Moreover, the annular outer shell 415 is connected with the upper cover 414, and disposed under the outer cover 413. The hollow connecting plate 416 is disposed within the annular outer shell 415. Moreover, the hollow connecting plate 416 is connected with the base plate 46 and fixed on the upper cover 414, and the rear swinging part 42 is engaged with the hollow connecting plate 416.

The structures and operating principles of other components of the mouse device 4 are similar to those of the mouse device 2 of the first embodiment, and are not redundantly described herein.

From the above descriptions, the rear swinging part with the second slant is located at the rear end of the main casing, and the bulge with the first slant is located at the rear end of the base plate. As a consequence, the main body can be swung relative to the base plate in the first direction or the second direction.

Moreover, when the bottom surface of the rear swinging part of the mouse device is moved along the top surface of the bulge, the movement is a surface contact sliding action. Consequently, for allowing the rear swinging part to be swung relative to the bulge, the user has to apply a larger force to depress the main casing. Under this circumstance, the tactile feel of depressing the main casing is more stable, and it is feasible to use the user's finger to touch the surface of the main casing to perform the touch control.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A mouse device, comprising:
    a base plate comprising a concave part and a bulge, wherein the concave part is located at a front end of the base plate, and the bulge is located at a rear end of the base plate, wherein the bulge has a top surface with a first slant, and the first slant is inclined from an outer periphery of the top surface of the bulge toward a middle region of the top surface of the bulge;
    a main casing connected with the base plate and disposed over the base plate, wherein the main casing comprises a front swinging part and two pressing parts, wherein the front swinging part is located at a front end of the main casing and embedded within the concave part of the base plate, and the two pressing parts are located at bilateral sides of the front swinging part, respectively;
    a rear swinging part located at a rear end of the main casing, wherein the rear swinging part has a bottom surface with a second slant, wherein the second slant is inclined from an outer periphery of a bottom surface of the rear swinging part to a middle region of the bottom surface of the rear swinging part, and the bottom surface of the rear swinging part is contacted with the top surface of the bulge;
    a first circuit board disposed on the base plate; and
    a first switch and a second switch disposed on the first circuit board,
    wherein when a first side of the main casing is depressed, the front swinging part and the rear swinging part allow the main casing to be swung relative to the base plate in a first direction, so that the first switch is triggered by one of the two pressing parts, wherein when a second side of the main casing is depressed, the front swinging part and the rear swinging part allow the main casing to be swung relative to the base plate in a second direction, so that the second switch is triggered by the other one of the two pressing parts.

2. The mouse device according to claim 1, wherein the first slant of the bulge is upwardly inclined from the outer periphery of the top surface of the bulge toward the middle region of the top surface of the bulge, and the second slant of the rear swinging part is inclined upwardly from the outer periphery of the bottom surface of the rear swinging part to the middle region of the bottom surface of the rear swinging part.

3. The mouse device according to claim 1, wherein the first slant of the bulge is downwardly inclined from the outer periphery of the top surface of the bulge toward the middle region of the top surface of the bulge, and the second slant of the rear swinging part is inclined downwardly from the outer periphery of the bottom surface of the rear swinging part to the middle region of the bottom surface of the rear swinging part.

4. The mouse device according to claim 1, wherein the top surface of the bulge and the bottom surface of the rear swinging part are annular surfaces.

5. The mouse device according to claim 1, further comprising a fixing block, wherein the fixing block is penetrated through the bulge of the base plate, and the fixing block comprises:
    an insertion part penetrated upwardly through the bulge, and locked into the rear swinging part; and
    a stopping part extended downwardly from the insertion part, wherein the stopping part is disposed under a bottom surface of the bulge, and the stopping part has an annular stopping surface to be contacted with the bottom surface of the bulge, wherein the annular stopping surface has a third slant, and the third slant is inclined upwardly from an outer periphery of the annular stopping surface toward a middle region of the annular stopping surface.

6. The mouse device according to claim 5, further comprising a fastening element, wherein the fastening element is penetrated through the fixing block and the rear swinging part, and tightened into the rear end of the main casing, so that the fixing block and the rear swinging part are securely fixed on the main casing.

7. The mouse device according to claim 1, further comprising a capacitive sensing film, wherein the capacitive sensing film is disposed within the main casing.

8. The mouse device according to claim 7, further comprising a second circuit board, which is disposed over the first circuit board, wherein the capacitive sensing film is electrically connected with the second circuit board, and the second circuit board is electrically connected with the first circuit board.

9. The mouse device according to claim 1, further comprising two elastic elements, wherein the two elastic elements are arranged between the main casing and the base plate for allowing the main casing to be returned to an original position.

10. The mouse device according to claim 1, wherein the main casing comprises:
    an outer cover;
    an upper cover disposed under the outer cover, wherein the front swinging part and the two pressing parts are protruded from an inner surface of the upper cover;

an annular outer shell connected with the upper cover, and disposed under the outer cover; and a hollow connecting plate disposed within the annular outer shell, wherein the hollow connecting plate is connected with the base plate and fixed on the upper cover, and the rear swinging part is engaged with the hollow connecting plate.

* * * * *